United States Patent [19]

Meillet

[11] Patent Number: 4,880,302
[45] Date of Patent: Nov. 14, 1989

[54] EYE GLASSES FOR APPLYING MAKEUP

[76] Inventor: Michel Meillet, Centre Commercial Le Plateau, La Duchere Lyon 9 eme-Rhone, France

[21] Appl. No.: 185,130

[22] Filed: Apr. 19, 1988

[51] Int. Cl.⁴ .......................... G02C 9/02; G02C 7/08
[52] U.S. Cl. .......................................... 351/59; 351/57
[58] Field of Search .......................... 351/55, 57, 59, 58

[56]   References Cited
U.S. PATENT DOCUMENTS 3,434,780  3/1969  Bolden ............................... 351/59 X
3,840,294  10/1974  Kneier ................................. 351/59

Primary Examiner—Rodney B. Bovernick
Attorney, Agent, or Firm—Arnold S. Weintraub

[57]   ABSTRACT

The invention concerns a pair of eyeglasses for making up or for examining the eyes.

A rotatable eyepiece pivots around its axis (7) to abut against either one of the two front frames. Each of these frames has no upper or superior part.

2 Claims, 3 Drawing Sheets

EYE GLASSES FOR APPLYING MAKEUP

BACKGROUND OF THE INVENTION

1. Field of the Invention

The present invention relates to a pair of glasses of a new type specifically provided to effectuate making up a face or for medical or physiological observations.

2. Prior Art

In applying make-up to an eye or otherwise attempting to observe one eye with the other eye great difficulties are ordinarily encountered.

In order to resolve this problem, different systems have been devised, which, all, present inconveniences, concerning both the ease of utilization as well as their high cost price. In particular, the majority of known systems present two detachable lenses, one for each eye.

The present invention is a measure intended to avoid these inconveniences while creating a pair of glasses useful in applying makeup in one instance and at the same time being practical and inexpensive.

SUMMARY OF THE INVENTION

Generally speaking, it consists of a pair of eye glasses permitting the one utilizing them to observe one of her eyes with the other eye in front of which is a corrective lens, for example a magnifying lens.

A pair of glasses according to the invention allows a frame formed of one side or face (or front) and two arms, the front thereof being formed by two frames joined above the nose by a transverse, horizontal bar. The glasses hereof are characterized in that, on the front of the bar, a vertical axis is provided, on which an eyepiece is articulated, which can in this way be folded back voluntarily toward the right in front of the right eye, or toward the left, in front of the left eye.

According to another characteristic of the invention, the eyepiece possesses, around its axis, a range of clearance more than or equal to 180°.

According to another characteristic of the invention, each of the two visual frames of vision of the face of the main frame or face of the frame links the nose bar to a corresponding arm, uniquely, by its lower part in a curved profile so that it doesn't possess any upper part. Because of this, no fixed part happens to be in front of the upper zone of the eyes, which facilitates observation of the making up of the eyelashes or eyelids.

The attached drawings, given by way of non-restrictive example, will permit to better understand the characteristics of the invention, and the advantages that it is susceptible of procuring is provided.

DETAILED DESCRIPTION OF THE PREFERRED EMBODIMENT

Figure 1:
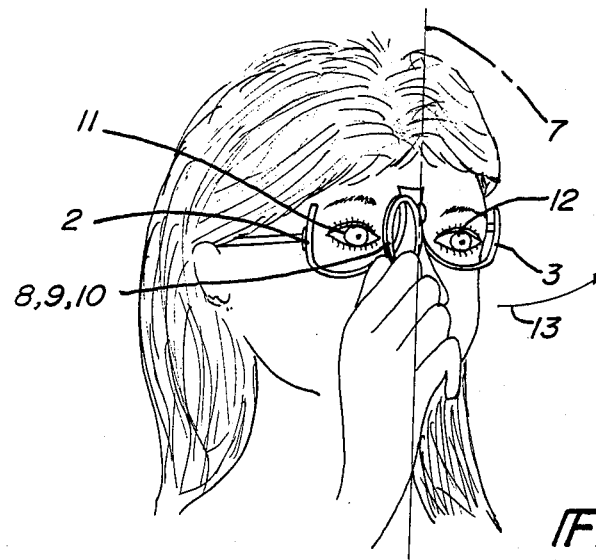
FIG. 1, 2 and 3 show three different ways a woman utilizing the pair of glasses according to the invention for making up her eyes.

The pair of glasses 1, illustrated in the drawings, possesses a front formed of two frames 2 and 3 connected above the nose by a transverse, horizontal bridge or bar 4. On the sides of frames 2 and 3, two arms 5 and 6, are articulated, in a known fashion.

Figure 2:
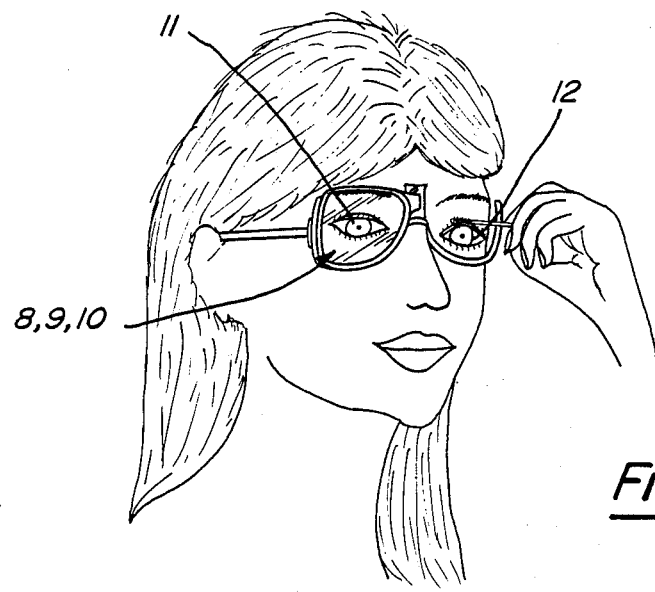
Figure 5:
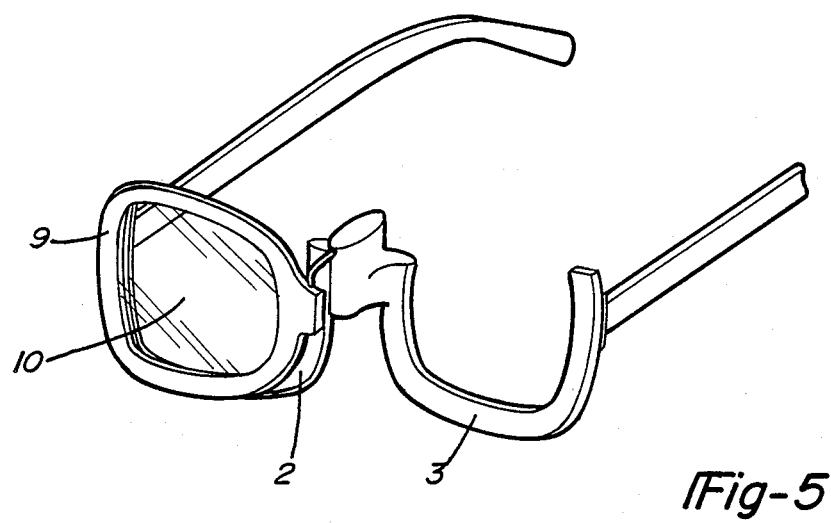
Figure 3:
Figure 6:
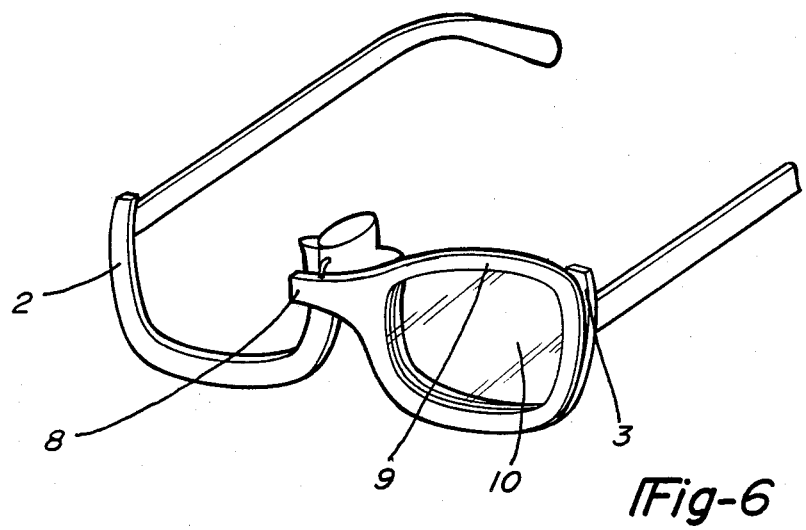

On the front of the bar 4 a vertical axis 7 is provided, onto which is mounted a fastening member 8 of a frame 9. The frame 9 is pivotally rotatably mounted on the member 8 and is rotatable about a horizontal axis through at least 180°. A magnifying lens or the like 10 is disposed within the frame 9. The assembly of member 8, frame 9, and lens 10 define an eyepiece that the user can move as she pleases:

either against the part in front of frame 2 (FIGS. 2 and 5)

or against the part in front of frame 3 (FIGS. 3 and 6).

Lastly, it is to be noted that each frame 2, 3, is devoid of all of a superior or upper part in order to join the cross piece 4 to arms 5 or 6. Each frame 2, 3 has a curved profile situated entirely above the visual range of the eye 11 or eye 12.

The functioning is as follows:

When the user is wearing the pair of glasses according to the invention, she can rotate the eyepiece 8, 9, 10 toward the right which is, therefore, applied against the front of the frame 2, corresponding to her right eye 11 (FIGS. 2 and 5). Like this, when the user places herself in front of a mirror (not shown) her right eye 11 benefits from vision through the magnifying lens or corrective lens 10, to observe her left eye 12 and to proceed with her making up.

Figure 4:
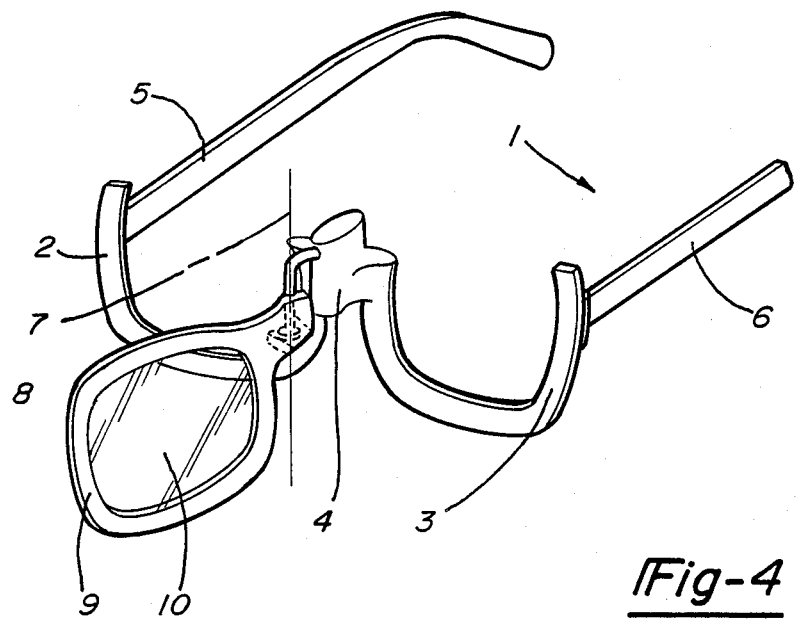
FIG. 4, 5 and 6 show the detail of the pair of glasses, respectively in the case of FIGS. 1, 2 and 3.

To proceed to making up of the right eye 11, it suffices to pivot the eyepiece 8, 9, 10 toward the left (figures 1 and 4; arrow 13) until it is applied or abuts against the left frame (FIGS. 3 and 6).

One notices that, since each frame 2, 3 is devoid of a superior part, no fixed part is in front of the upper zone of the eye to be made up (12, on FIG. 1; 11 on FIG. 3). Nothing, therefore, hinders the user in making up her eyelashes or eyelids.

Having, thus, described the invention, what is claimed is:

1. In a pair of makeup eyeglasses the improvement comprising:

a frame having a front and a pair of arms;

the front comprising:

a pair of vision frames; each vision frame being defined by only a lower part having a curved profile, such that each vision frame is entirely laterally outside and below the visual range of an associated eye of a user;

a transverse horizontal bridge disposed on a nose of a user connecting the pair of vision frames, the bridge having a vertical axis;

a bracket secured to the bridge along the vertical axis;

a frame horizontally rotatably mounted to the bracket such that the frame can be rotated about a vertical axis, away from the face of a user to abut against either of the one of the pair of vision frames; and a lens disposed within the horizontally rotatable frame, the bracket, horizontally rotatable frame and lens defining an eyepiece.

2. The pair of eyeglasses according to claim 1 wherein:

the horizontally rotatable frame is horizontally rotatable about the vertical axis through a range equal to or greater than 180°.

* * * * *